Figures 1, 1A:
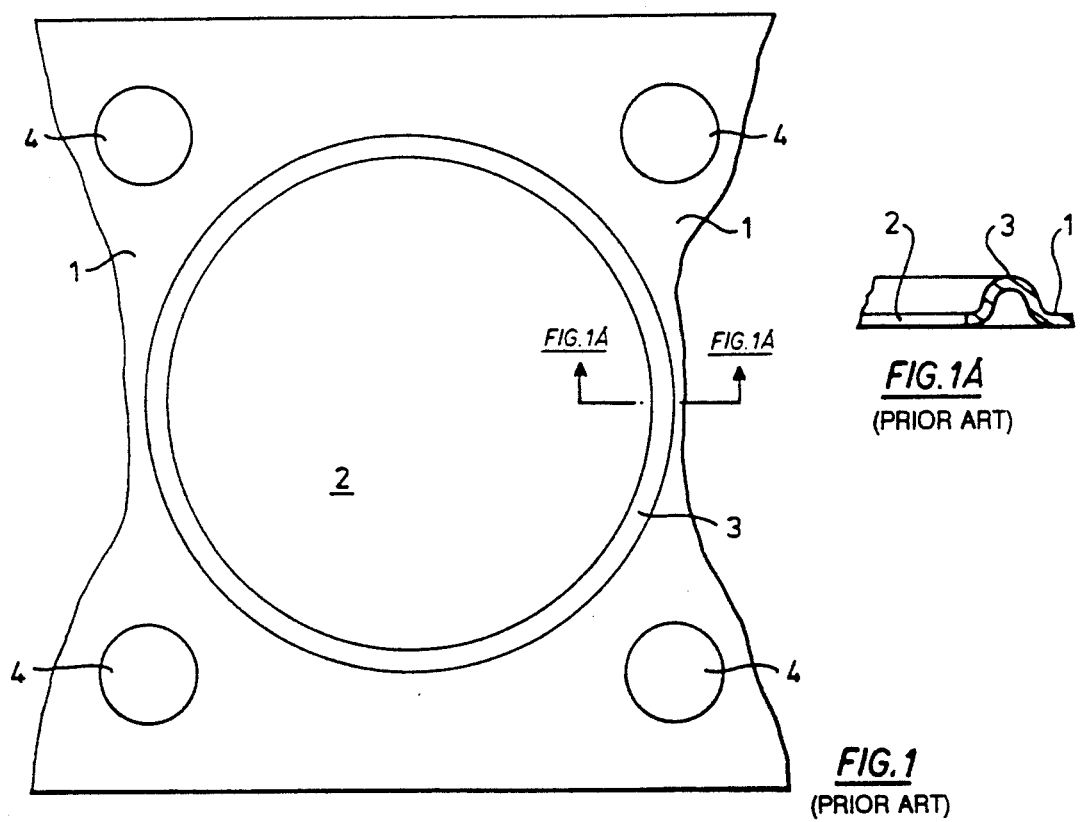

United States Patent [19]
Harland

[11] Patent Number: 5,253,416
[45] Date of Patent: Oct. 19, 1993

[54] METHOD OF MANUFACTURING A GASKET

[76] Inventor: Christopher R. Harland, Cawston House, Cawston, Rugby, Warwickshire, England

[21] Appl. No.: 861,890
[22] PCT Filed: Oct. 7, 1991
[86] PCT No.: PCT/GB91/01738
§ 371 Date:
§ 102(e) Date:
[87] PCT Pub. No.: 992
PCT Pub. Date:

[30] Foreign Application Priority Data

Oct. 9, 1990 [GB] United Kingdom ............... 9021977

[51] Int. Cl.⁵ .............................................. B21D 53/84
[52] U.S. Cl. ............................................ 29/888.3; 72/335
[58] Field of Search ............... 72/335, 336, 333, 332, 72/327, 379.2; 29/888.3

[56] References Cited

U.S. PATENT DOCUMENTS

| | | | |
|---|---|---|---|
| 145,702 | 12/1873 | Weeden | 72/327 |
| 1,851,948 | 3/1932 | Summers . | |
| 1,861,648 | 6/1932 | Vehko | 72/333 |
| 2,152,630 | 4/1939 | Balfe | 288/1 |
| 4,372,564 | 2/1983 | Gasket . | |
| 4,465,287 | 8/1984 | Bindel et al. | 277/235 |
| 4,471,968 | 9/1984 | Schlaupitz et al. | 277/235 |
| 4,519,619 | 5/1985 | Doyle | 277/235 |
| 4,721,315 | 1/1988 | Ueta | 277/235 |
| 4,765,634 | 8/1988 | Kobayashi et al. | 277/235 |
| 4,799,695 | 1/1989 | Yoshino | 277/231 |
| 4,813,691 | 3/1989 | Schoenborn | 29/888.3 |
| 4,826,708 | 5/1989 | Udagawa | 29/888.3 |

FOREIGN PATENT DOCUMENTS

| | | | |
|---|---|---|---|
| 1452723 | 7/1965 | France . | |
| 2065873 | 8/1971 | France . | |
| 269941 | 11/1986 | Japan | 72/335 |
| 725749 | 4/1980 | U.S.S.R. | 72/336 |
| 1388145 | 4/1988 | U.S.S.R. | 72/333 |
| 1412841 | 7/1988 | U.S.S.R. | 72/335 |
| 931710 | 7/1963 | United Kingdom . | |
| 1370125 | 10/1974 | United Kingdom . | |
| 2115503A | 9/1983 | United Kingdom . | |

Primary Examiner—Daniel C. Crane
Attorney, Agent, or Firm—Nixon & Vanderhye

[57] ABSTRACT

A method of making a gasket of the kind wherein at least one aperture is blanked out at a desired location in a metal plate before or after, or at the same time as a peripheral corrugation is formed around the margin of said aperture, is characterized in that said corrugation is formed in the sheet around the intended location of said one aperture after an initial step of forming at least one preliminary aperture at said location, the shape and configuration of said preliminary aperture being selected in accordance with the proximity of the said one aperture to the edges of the plate and to the location of any other intended aperture in the plate, so that the corrugation formed after said preliminary aperture forming step exhibits controlled geometry and plastic deformation when subjected to compression.

7 Claims, 5 Drawing Sheets

METHOD OF MANUFACTURING A GASKET

This invention relates to gaskets of the kind in which a metal sheet contains at least one aperture whose margins are to be sealed when the gasket is in use in the interface between confronting hardware components. Confronting pipe flanges, cylinder head/cylinder block joints are typical applications for sheet metal gaskets.

It is well-known to form an aperture or plurality of apertures in a metal sheet, for example, by a blanking operation between co-operating press tools. The, or each, aperture may thereafter be equipped with sealing means such as an elastomeric grommet, or a metal eyelet, so that in use in the intended joint, the margin of the, or each, aperture is sealed by virtue of localised pressure around the margin of the, or each, aperture. It is also well-known to form at least one annular corrugation in the sheet material around the aperture or apertures whose margins are to be sealed. In some cases, such a corrugation has been employed instead of a metal eyelet; in other cases, such a corrugation has been enclosed by a metal eyelet. It has also been proposed to insert metal strips or shims under eyelets.

In all instances the objective is to enhance the sealing performance, by developing sufficiently high, localised pressure around the margin of the aperture, or apertures. However, there are other factors which make realisation of a perfect seal somewhat uncertain. Apart from factors such as temperature, which may cause a loss of clamping stress, and vibration, a much more serious problem often arises from the necessarily spaced-apart locations of the bolts used to clamp the confronting components together. Allied to this, there is the effect of component distortion caused by the spaced-apart bolts. Even where the bolts are carefully and uniformly stressed, the pressure developed in between adjacent bolts is not necessarily uniform and can result in leakage, particularly in those regions of a gasket which are located between relatively widely spaced-apart bolts.

Hardware distortion is a known problem and there are several ways of minimising its effects. Apart from re-designing the confronting components joined by the gasket (and such a re-design is not always feasible, but is always costly), it is common practice to selectively reinforce the gasket so as to direct increased pressure towards those areas thought to be most at risk of leakage. For example, solid "compression stops" have been used to counteract the effects of hardware distortion, by introducing deliberate, oppositely directed distortion. In the case of sheet metal gaskets provided with elastomeric seals in the form of continuous or discontinuous strips, the latter have been applied in non-uniform widths and/or thicknesses, again with the objective of developing sealing performance appropriate to individual regions of the gasket. Each of these commonly used expedients has its advantages and disadvantages. But as the confronting components are made progressively lighter, to reduce their cost, and as operating conditions such as pressures and temperatures become more demanding, there is a need for improved gasket performance, particularly in the field of internal combustion engines.

According to this invention, a method of making a gasket of the kind wherein at least one aperture is blanked out at a desired location in a metal plate and a peripheral corrugation is formed around the margin of said aperture, is characterised in that said corrugation is formed in the sheet around the intended location of said one aperture after an initial step of forming at least one preliminary aperture at said location, the shape and configuration of said preliminary aperture being selected in accordance with the proximity of the said one aperture to the edges of the plate and to the location of any other intended aperture in the plate, so that the corrugation formed after said preliminary aperture forming step exhibits controlled geometry and plastic deformation when subjected to compression.

The method of the invention preferably also includes a step of blanking out the said one aperture, after forming the corrugation. It may also include a step of fitting the said one aperture with one or more eyelet(s) which is or are thereafter pressed or otherwise folded around to enclose the corrugation.

Preferably the shape and configuration of the preliminary aperture (or apertures, since more than one such may be formed, according to local requirements) is selected such that the corrugation also has a non-uniform profile, as seen in cross-section. It is however particularly preferred that the corrugation-forming step is carried out be means of a press tool having a uniform profile, also as seen in cross-section.

Reference was made earlier to the corrugation exhibiting controlled geometry and plastic deformation when subjected to compression. It has been found that by an appropriate selection of the parameters of the preliminary aperture, specifically its shape and configuration in relation to the sheet edges and/or proximity to any adjacent aperture, it is possible to control the way in which the corrugation is formed. In this context, factors such as the relative availability of an amount of metal to be deformed, as well as the stresses involved in the actual deformation, can be selectively controlled to achieve a desired corrugation profile. It should be noted that a uniform corrugation profile will not usually be the end result, since the invention makes it possible to develop a corrugation which will, in use as a gasket, develop a sensibly uniform sealing characteristic around most if not all of the margin of the aperture which is to be sealed. As previously recited, hardware distortions due to uneven bolt load distribution, temperature variations and the like result in unwanted asymmetry. By use of the method of this invention, the corrugation can be tailored to at least partly compensate for this unwanted asymmetry.

Furthermore, because the need for the manufature and installation of special shims and/or compression stops is eliminated, the manufacturing process is simplified, particularly as a uniform tool profile can be used to develop a corrugation which is not in fact uniform. The extra step, of forming at least one preliminary aperture, is a relatively routine pressing operation, requiring only conventional press tooling once the appropriate preliminary aperture shape/configuration has been selected, together with their number and relative disposition, if more than one is required.

The exact mechanism whereby the present invention works may be described in general terms as follows. The step of forming the preliminary aperture ("pre-blanking") allows the remaining material to have a flexibility that it would not otherwise have. Subject to the workpiece geometry, material properties and tool geometry, the workpiece can undergo increased plastic deformation. The area subjected to deformation experiences increased work hardening and therefore the resultant deformation will exhibit increased stiffness on compression. At the same time, the geometry of the deformation will be modified; for example, a corrugation will have greater or less depth, according to its proximity (or otherwise) to a preliminary aperture. However, even where the geometry of the corrugation appears to be the same, there is increased plastic deformation where a preliminary aperture has been formed according to this invention. Thus even where a corrugation has the same or very similar height characteristics to a conventionally-made corrugation, its compression characteristics may be significantly modified.

The present invention therefore provides a unique means whereby gasket properties can be designed to suit a specific application, without significant increase in cost/complexity.

As a further by-product of the invention, it also appears possible to minimize the overall distortion of the metal sheet which results from blanking and/or corrugation carried out in the conventional way. Any need to subsequently flatten a finished, or semi-finished gasket may thus be avoided or at least minimized.

The invention further includes gaskets made by the method of the invention and in particular, cylinder head gaskets for internal combustion engines and the like.

Figure 2:
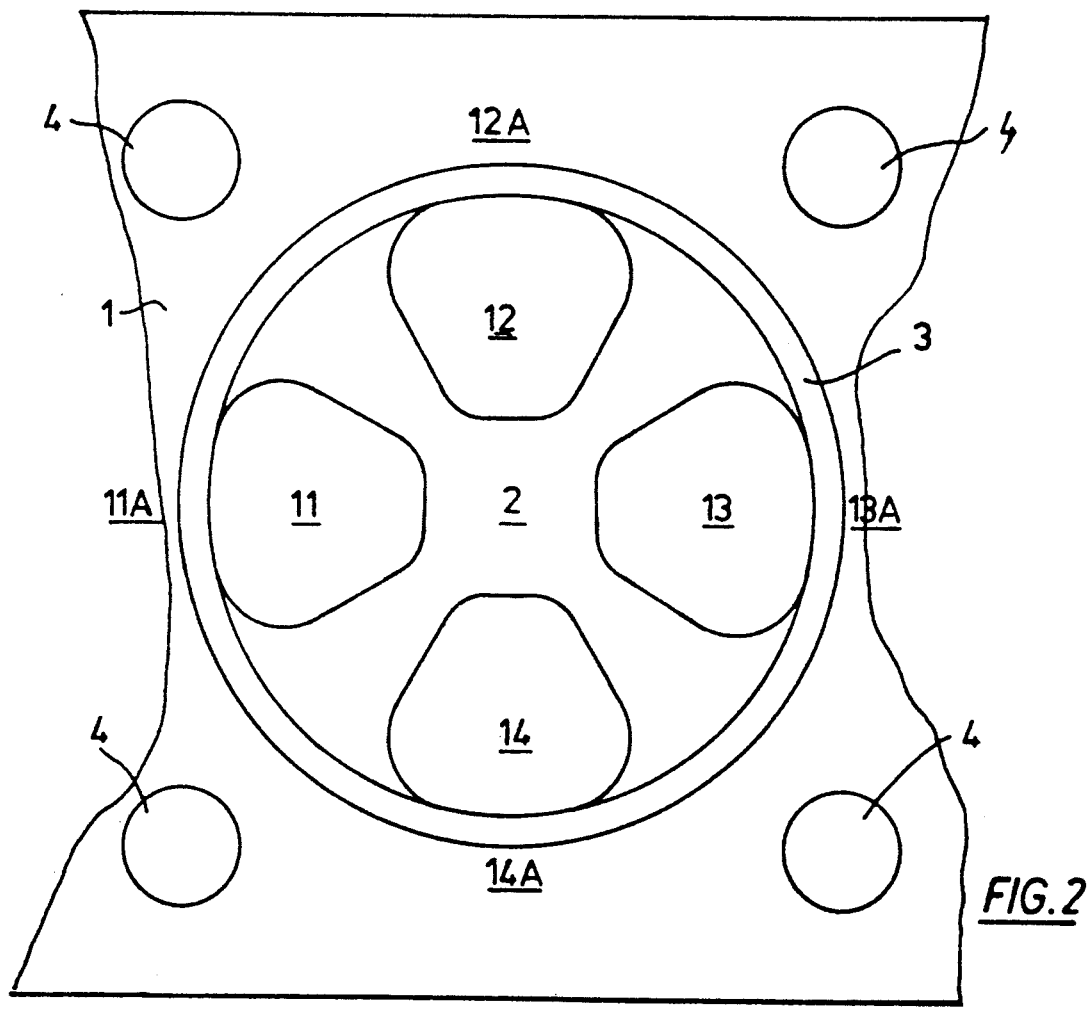
Figure 3:
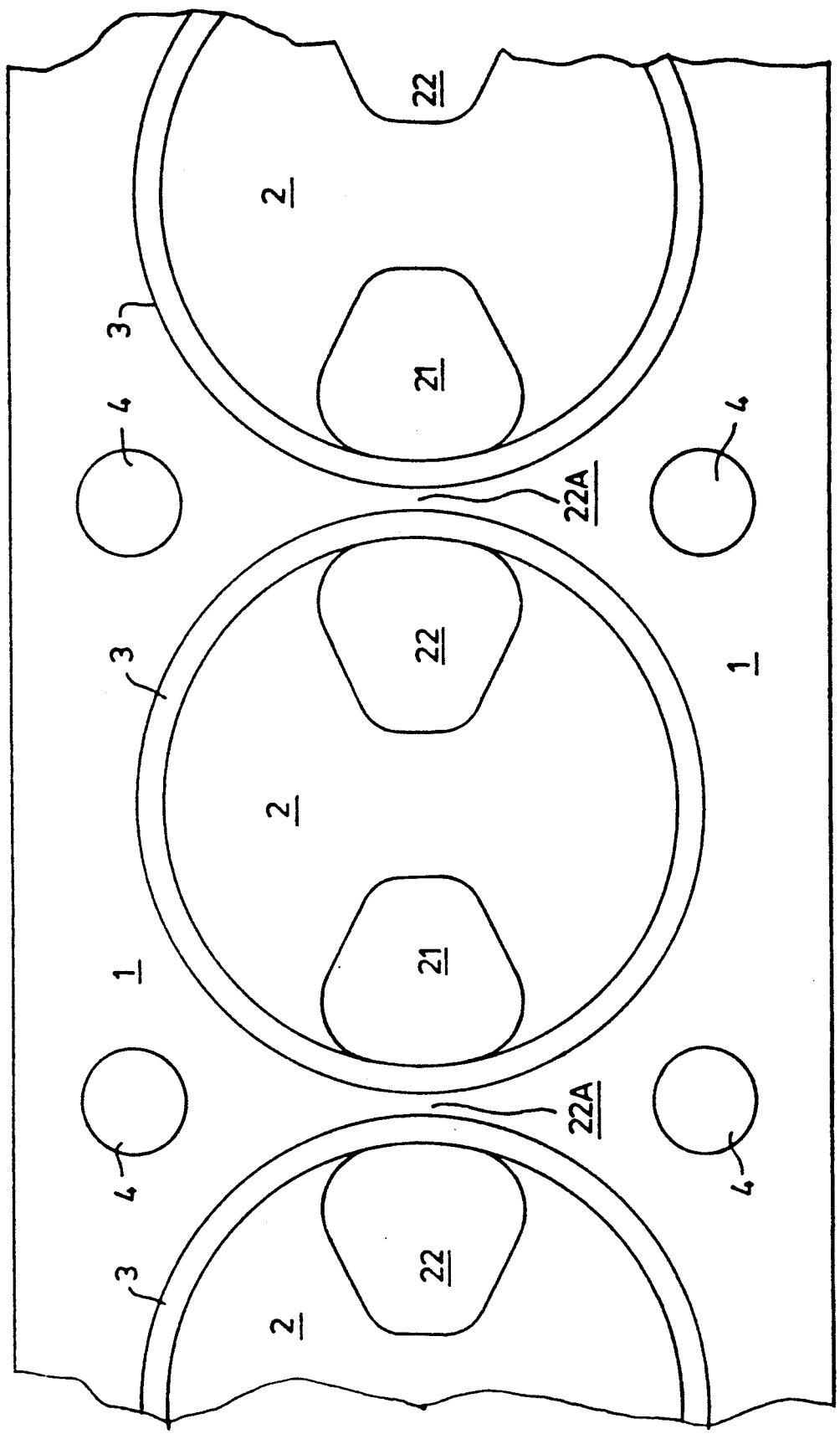
Figure 4:
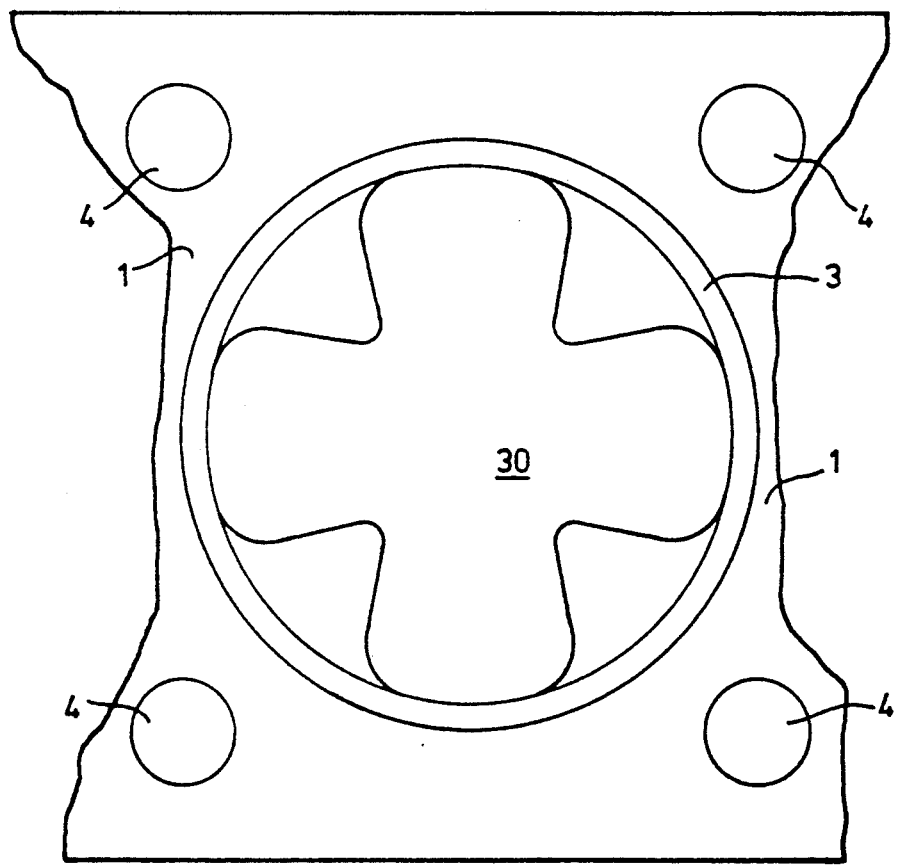
Figure 5:
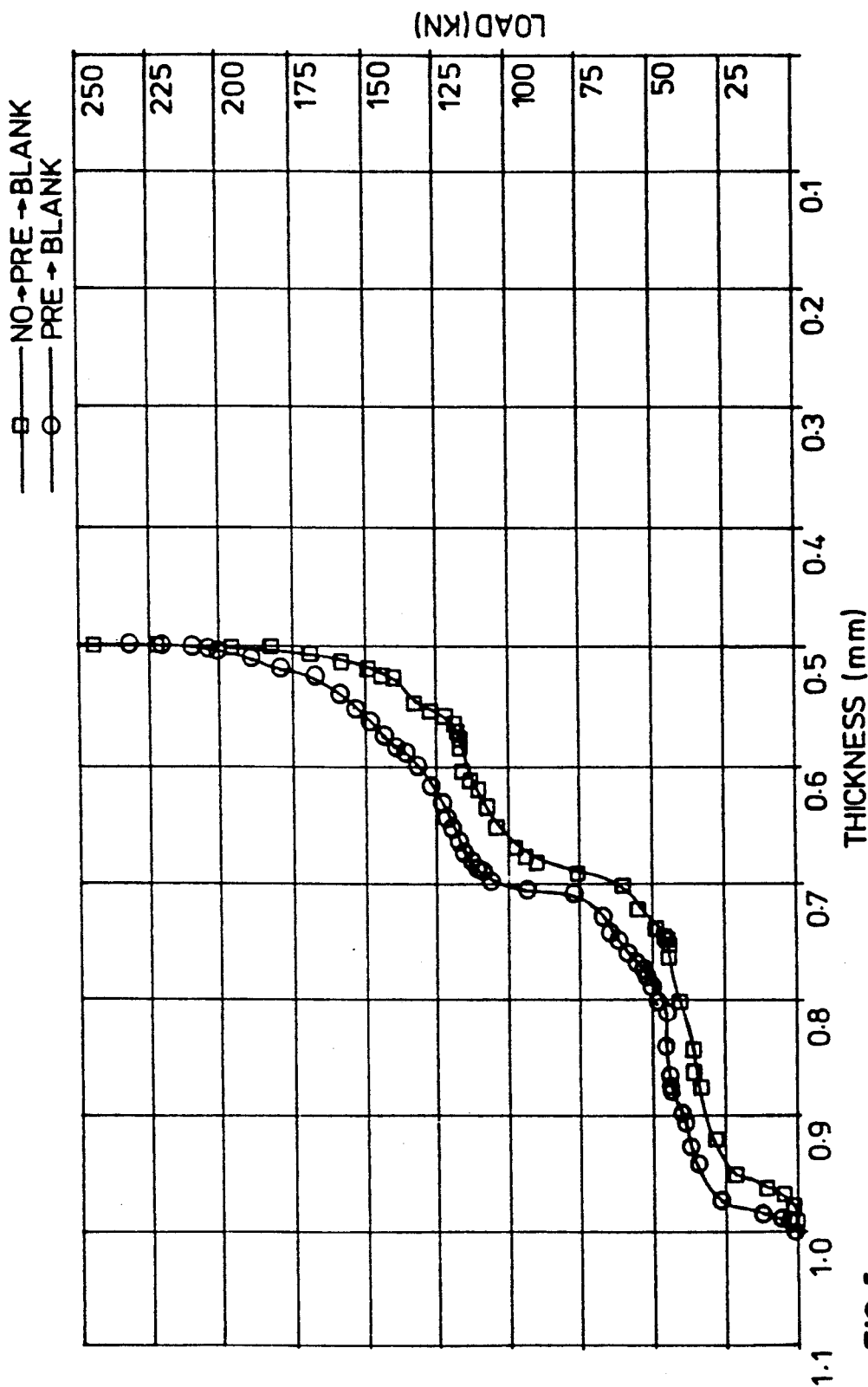

In order that the invention be better understood, an embodiment of it will now be described by way of example only with reference to the accompanying drawings, in which:

FIG. 1 is a plan view of a prior art gasket, including a scrap section (FIG. 1A) taken along line X—X of FIG. 1, noting that in FIG. 1A, an optional eyelet is shown in phantom, FIG. 2 is a plan view of the gasket of FIG. 1 modified according to the present invention, FIG. 3 is a plan view of the gasket of FIG. 1 illustrating a different modification according to this invention, FIG. 4 is a plan view of the gasket of FIG. 1 illustrating a further modification according to the invention, and FIG. 5 is a graphical comparison of the compression characteristics of the gasket of FIG. 1 with those of the gasket of FIG. 2.

In FIG. 1, a single, relatively large aperture 2 is formed in a metal plate 1. An embossed bead in the form of the aperture 2. FIG. 1A illustrates (on an enlarged scale) the cross-sectional view through the corrugation 3. The same cross-sectional profile 3 is applicable to all of FIG. 1-4 inclusive. FIG. 1 illustrates conventional practice. All the apertures plus the annular corrugation may be made in a single operation, although it is also common practice to form the apertures prior to forming the corrugation as a separate operation. It is also possible to form the corrugation prior to blanking out the apertures. It will be appreciated that, if more apertures are required, these too will be made as part of the same production sequence, so that for a cylinder head gasket for a four cylinder engine, there would be four relatively large cylinder bore apertures 2 and a plurality of fixing bolt holes 4. In a practical gasket there would also be oil/water passageways, but for ease of illustration these are not shown in FIG. 1.

In use, the gasket is clamped between a pair of confronting surfaces through which are defined apertures corresponding to 2 and 4, using a set of four bolts, one for each of the apertures 4. As these bolts are progressively tightened, compressive forces are developed in the corrugation 3, causing it to flatten towards the initial thickness of the metal plate and at the same time, developing a sealing pressure around the margin of aperture 2. (Similar considerations would apply of course to a multi-aperture version of FIG. 1 when installed for example between a cylinder head and cylinder block).

FIG. 2 illustrates the application of the present invention to the gasket of FIG. 1. One of the problems with the conventional arrangement just described in relation to FIG. 1 is the fact that the sealing pressure developed is not uniform around the circumference of the aperture 2. In particular, a higher pressure is developed in the vicinity of the bolts (in the vicinity of the apertures 4) than in those regions approximately halfway between the bolts. In this case, there are thus four regions equally spaced around the corrugation 3 where a lower compressive force is developed when the gasket is in use. These four regions constitute potentially leakage prone areas. In FIG. 2, this is addressed by a preliminary step of forming apertures 11, 12, 13 and 14, before carrying out the normal blanking/corrugating operation. Selective removal of these areas leaves the immediately adjacent areas 11A, 12A, 13A and 14A in a relatively more flexible condition for the main blanking and corrugation forming step which follows. As a direct result of this, increased plastic deformation of areas 11A, 12A, 13A and 14A takes place, so that the corrugation 3 exhibits greater local work hardening. The actual extent of this is determined primarily by the size and configuration of the preliminary apertures 11, 12, 13 and 14; some experiment may be required to achieve optimum results. By suitably choosing size and configuration for apertures 11, 12, 13 and 14, the final product will include a corrugation which on compression develops a sensibly constant sealing pressure around the entire margin of the final aperture 2, the previously relatively weak regions between the bolts being now stiffer than in a conventional gasket such as was described in relation to FIG. 1.

FIG. 3 illustrates a typical practical application, where several apertures 2 are to be located close together, side by side in a single gasket, for example, an automotive cylinder head gasket. It is usual in such cases for there to be only a narrow metal bridge between cylinder bore apertures. This narrow bridge is a problem area for gasket designers because satisfactory sealing between cylinder bores is essential, yet difficult to achieve by conventional means. Solutions to the problem include for example the provision of additional reinforcing elements in the bridge area. However, by using the pre-blanking technique of this invention to produce preliminary apertures 21, 22, the metal in the intended bridge area is rendered relatively flexible (or relatively unrestrained). Consequently, on application of the final blanking step, the bridge area 21A, 22A is able to undergo increased plastic deformation and work hardening, exactly as discussed earlier in relation to FIG. 2. Furthermore, because pairs of adjacent preliminary apertures are so close together, leaving only a narrow metal region between them, the plastic deformation possible is high, in relative terms. Accordingly, the corrugations 3 subsequently formed will, in the bore bridge area, exhibit increased resistance to compression. This is what is required to assure improved sealing pressure and leakage resistance resulting therefrom.

Referring now to FIG. 4, it is to be understood that one preliminary aperture may serve several purposes. In this example, a single, four-lobed aperture 30 resembling a clover leaf is used to impart increased plastic deformation properties to four discrete areas of the annular corrugation 3. These areas are equally spaced apart around the circumference of the final aperture 2. As described in relation to FIG. 1, the result is an annular corrugation which exhibits improved resistance to compression in those previously relatively leakage prone areas between adjacent fixing bolts.

FIG. 5 demonstrates the effect of applying the principles of this invention to a cylinder head gasket of the kind just discussed in relation to FIG. 3. In FIG. 5, compressive force is plotted against thickness. The latter is the sum of the base sheet thickness and the actual corrugation height produced by the blanking operation. It will be appreciated that on compression, the final height of the corrugation when as fully flattened as possible will approach zero. In FIG. 5, this is represented by the thickness of the steel sheet, 0.5 mm.

Two graphs are plotted on the same scales. The first of these is for a conventionally formed corrugation, there being no preliminary aperture forming step (graph plot points indicated by squares). The second is for the gasket of FIG. 3, the graph plot points being indicated by circles. Both graphs show the response to compression along a common line radially through the bore bridge area, 21A, in FIG. 3.

Both graphs are based on blanking to a target corrugation height of 0.5 mm, giving a total initial thickness of about 1.0 mm. On applying a compressive force, the corrugation is progressively flattened. It is readily apparent from the graph that the force required to compress the corrugation is significantly higher where the preliminary aperture forming step of this invention is applied. For example, at a thickness of 0.7 mm, the conventional corrugation resists a force of about 60 kN, whilst the corrugation formed according to the invention resists a force of about 110 kN. It follows that in an actual gasket application, a corrugation formed by use of the present invention can develop a very significantly greater sealing pressure, despite being formed to the same height as a conventional corrugation.

I claim:

1. A method of manufacturing a gasket having at least one finally configured aperture surrounded by a peripheral corrugation comprising the steps of:
   a) forming at least one preliminary aperture in a predetermined location in a metal plate, within an area which will be surrounded by the finally configured aperture, the shape and configuration of said preliminary aperture chosen as a function of the proximity of said finally configured aperture to edges of the plate and to a location of any other aperture in the plate;
   b) forming the finally configured aperture;
   c) forming a peripheral corrugation in said metal plate in a marginal area of said finally configured aperture so that said peripheral corrugation exhibits controlled geometry and plastic deformation when subjected to compression; and
   d) forming said any other aperture in the plate.

2. The method of claim 1 wherein step (c) is carried out before, during or after step (b).

3. The method of claim 2 wherein one or more eyelets are fitted to said finally configured aperture so as to enclose and cover said corrugation.

4. The method of claim 2 wherein said corrugation exhibits a non-uniform profile, as seen in section around its circumference.

5. The method of claim 4 wherein said step (c) is carried out by means of a press tool having a uniform profile, as seen in cross-section around its circumference.

6. The method of claim 1 wherein a plurality of preliminary apertures is formed within said area prior to forming said corrugation.

7. The method of claim 1, wherein step d) is carried out prior to carrying out step c).

* * * * *